United States Patent
Suryanarayana

(10) Patent No.: US 12,346,270 B2
(45) Date of Patent: Jul. 1, 2025

(54) SOC-AGNOSTIC TUNING FOR PERIPHERAL DOCK

(71) Applicant: Dell Products L.P., Round Rock, TX (US)

(72) Inventor: Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 82 days.

(21) Appl. No.: 18/296,139

(22) Filed: Apr. 5, 2023

(65) Prior Publication Data

US 2024/0338326 A1 Oct. 10, 2024

(51) Int. Cl.
G06F 13/10 (2006.01)
G06F 1/3296 (2019.01)
G06F 8/65 (2018.01)

(52) U.S. Cl.
CPC .......... G06F 13/102 (2013.01); G06F 1/3296 (2013.01); G06F 8/65 (2013.01)

(58) Field of Classification Search
CPC ......... G06F 1/3296; G06F 8/65; G06F 13/102
See application file for complete search history.

(56) References Cited

U.S. PATENT DOCUMENTS

| 2017/0242686 | A1* | 8/2017 | Vidyadhara | G06F 8/656 |
| 2019/0339991 | A1* | 11/2019 | Reddy | H04L 9/3247 |
| 2020/0244454 | A1* | 7/2020 | Gupta | H04L 9/0894 |
| 2020/0285534 | A1* | 9/2020 | Chaiken | G06F 11/0745 |
| 2023/0359775 | A1* | 11/2023 | Huang | H04L 41/0889 |

* cited by examiner

*Primary Examiner* — Eric T Oberly
(74) *Attorney, Agent, or Firm* — Jackson Walker L.L.P.

(57) ABSTRACT

An information handling system may include at least one processor; and an interface via which one or more peripherals are configured to be communicatively coupled to the at least one processor; wherein the at least one processor is configured to execute instructions for: storing a data structure that includes data indicative of configuration settings for each of the one or more peripherals; communicating with the one or more peripherals according to the configuration settings of the data structure; and in response to an occurrence of a critical event that causes a loss of communication with the one or more peripherals, restoring the configuration settings based on the data structure without a reboot of the information handling system.

15 Claims, 3 Drawing Sheets

SOC-AGNOSTIC TUNING FOR PERIPHERAL DOCK

TECHNICAL FIELD

The present disclosure relates in general to information handling systems, and more particularly to configuration tuning for peripherals such as docks for portable information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system is coupled to a peripheral, various configuration settings may be established, and it would be advantageous to be able to retain those settings in various situations. For the sake of concreteness, the example of a dock peripheral is discussed in detail herein. One of ordinary skill in the art with the benefit of this disclosure will understand its applicability to other types of peripheral as well.

For example, a dock may allow various additional peripherals (e.g., one or more monitors, audio devices, keyboards, mouses, network adapters, etc.) to be coupled to an information handling system. When a user couples the dock to the information handling system, certain settings (e.g., dock-specific settings; multi-monitor settings such as which monitor is primary, the spatial arrangement of monitors, resolutions, and color depths; charging settings; and settings related to other peripherals coupled to the information handling system via the dock) may be created and saved.

For purposes of this disclosure, such settings may be referred to as best-known configuration (BKC) settings. In existing solutions, various critical events may cause BKC settings to be lost or other malfunctions to occur. For example, when a firmware update is performed (e.g., a firmware update of the dock or a firmware update such as a BIOS update in the information handling system), the BKC settings may be lost. Other critical events that may cause issues may include hot-plug events, standby events, resume events, and coupling different peripherals to a single information handling system (e.g., docks having different firmware versions).

Currently, there is no seamless protocol for dynamically detecting the change in firmware, identifying the BKC attributes which need to be re-synchronized across devices, and reinitializing all connected tables without a reboot of the information handling system and/or the dock.

Accordingly, embodiments of this disclosure may provide a Peripheral Interconnect Protocol (PIP) to dynamically detect the change in firmware, identify various BKC attributes across heterogeneous peripheral devices, and synchronize the attributes by reinitializing all connected firmware tables without needing a reboot of the information handling system.

Further, across heterogeneous peripheral devices and connected operating systems, all peripheral device enumerations may be carried out dynamically irrespective of firmware changes, ensuring that system failures due to device enumeration memory overruns do not occur. For example, reinitialization may occur based on unplug or re-plug events for a specific peripheral only, in order to ensure that device enumeration memory is not over-consumed, avoiding system hangs and unexpected shutdowns.

Thus embodiments may provide a seamless method to manage BKC firmware attributes across various peripheral devices and architectures heterogeneous processor (e.g., different systems-on-chip (SoCs)), heterogenous operating systems, and heterogeneous firmware versions. A peripheral device can be connected to different platforms having different such attributes, and the BKC settings may be intelligently managed.

It should be noted that some terms discussed herein are described in the Advanced Configuration and Power Interface (ACPI) Specification version 6.5, which was released in August 2022 (hereinafter, ACPI Specification), which is hereby incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with peripheral configuration tuning in information handling systems may be reduced or eliminated.

In accordance with embodiments of the present disclosure, an information handling system may include at least one processor; and an interface via which one or more peripherals are configured to be communicatively coupled to the at least one processor; wherein the at least one processor is configured to execute instructions for: storing a data structure that includes data indicative of configuration settings for each of the one or more peripherals; communicating with the one or more peripherals according to the configuration settings of the data structure; and in response to an occurrence of a critical event that causes a loss of communication with the one or more peripherals, restoring the configuration settings based on the data structure without a reboot of the information handling system.

In accordance with these and other embodiments of the present disclosure, a method may include an information handling system storing a data structure that includes data indicative of configuration settings for each of one or more peripherals that are configured to be coupled to the information handling system via an interface; the information handling system communicating with the one or more peripherals according to the configuration settings of the data structure; and in response to an occurrence of a critical event that causes a loss of communication with the one or more peripherals, the information handling system restoring the configuration settings based on the data structure without a reboot of the information handling system.

In accordance with these and other embodiments of the present disclosure, an article of manufacture may include a non-transitory, computer-readable medium having computer-executable code thereon that is executable by a processor of an information handling system for: storing a data structure that includes data indicative of configuration settings for each of one or more peripherals that are configured to be coupled to the information handling system via an interface; communicating with the one or more peripherals according to the configuration settings of the data structure; and in response to an occurrence of a critical event that causes a loss of communication with the one or more peripherals, restoring the configuration settings based on the data structure without a reboot of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
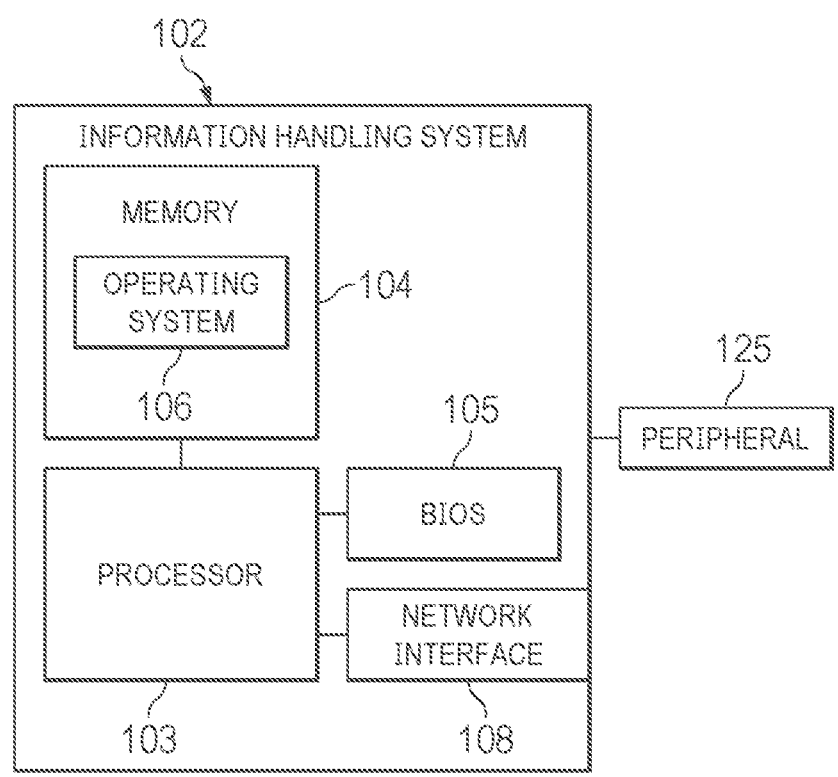
FIG. 1 illustrates a block diagram of an example information handling system, in accordance with embodiments of the present disclosure.
Figure 2:
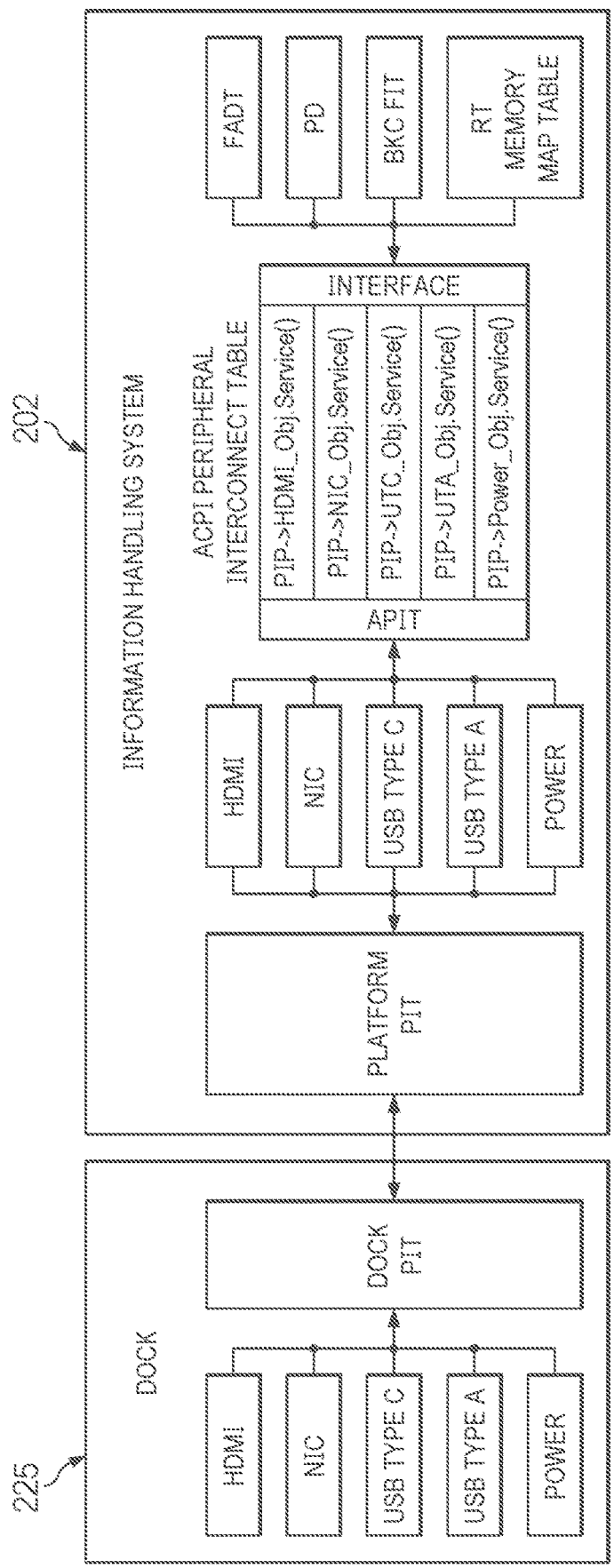
FIG. 2 illustrates an example architecture for coupling a dock peripheral to an information handling system, in accordance with embodiments of the present disclosure.
Figure 3:
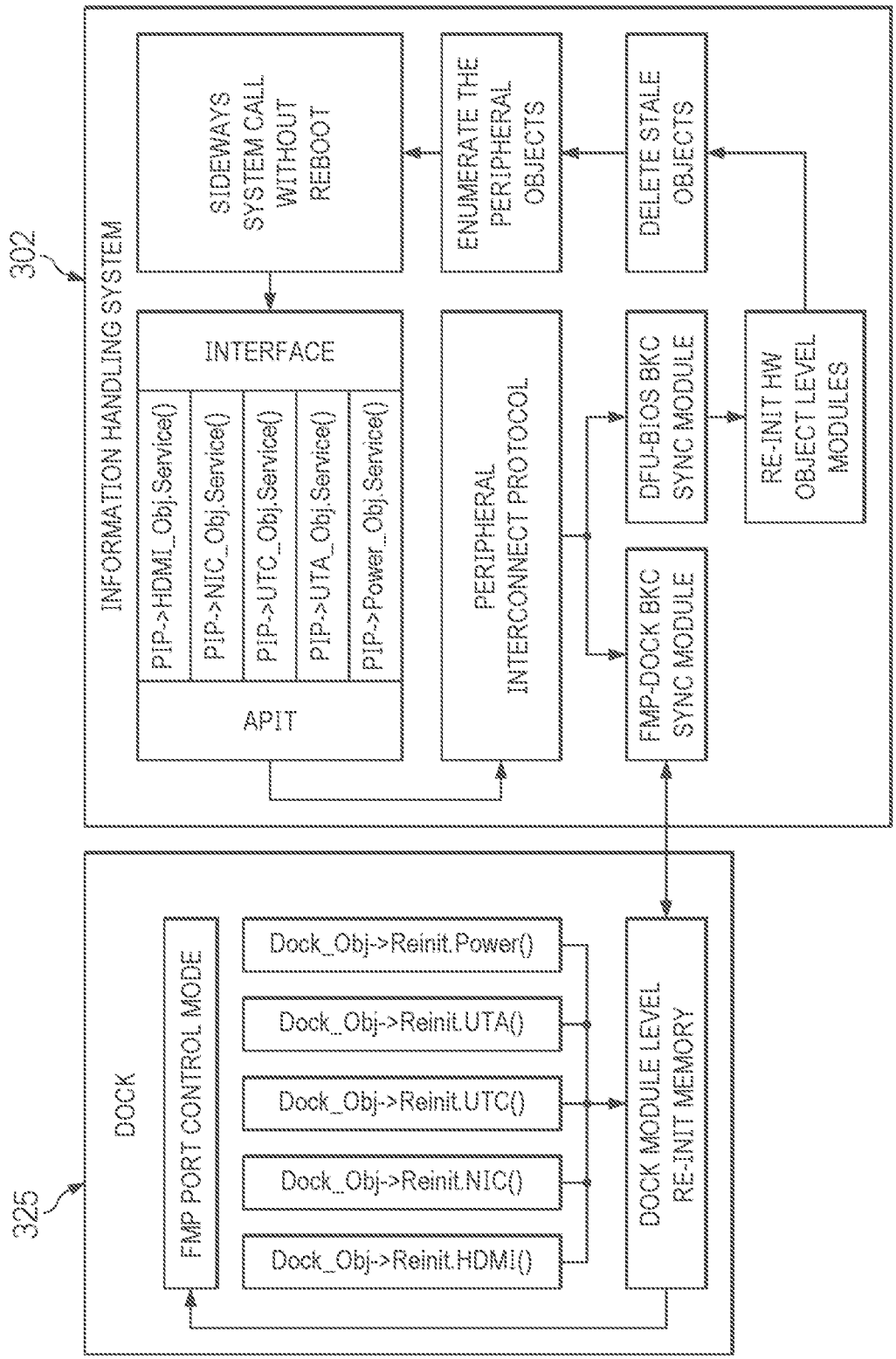
FIG. 3 illustrates another example architecture for coupling a dock peripheral to an information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may in some embodiments be communicatively coupled to a peripheral 125, which may be a dock (e.g., a USB Type-C dock). Information handling system 102 may receive power from peripheral 125, and one or more components of information handling system 102 may be communicatively coupled to peripheral 125 so as to transmit video and/or audio and/or data (e.g., keyboard and mouse input data) between information handling system 102 and peripheral 125. Various other peripherals may also be coupled to information handling system 102 via peripheral 125.

As discussed above, various BKC settings may be established between information handling system 102 and peripheral 125, and in existing solutions, issues can arise with regard to those settings when a firmware (e.g., BIOS 105 or a firmware internal to peripheral 125) is updated. In particular, the functionality of peripheral 125 may be unintentionally altered after such a firmware update. For example, audio and video problems may be present after a BKC firmware update of host BIOS firmware when connected to a dock.

Further, hot plugging and unplugging of devices such as storage resources, display devices, etc. from peripheral 125 (as well as hot plugging and unplugging peripheral 125 itself from information handling system 102) may result in problems such as improper device enumeration in a device manager running on information handling system 102. For example, duplicate entries may be present in device manager after such an event, consuming more memory than necessary and eventually requiring a reboot of information handling system 102 to remedy. In particular, in some cases, devices that have been unplugged from peripheral 125 may not properly de-enumerate, but still show up in device manager. Re-plugging such devices may then cause duplicate entries in device manager.

In some cases, resuming information handling system 102 from a low-power mode (e.g., S3, S4, modern stand-by, etc.) while peripheral 125 is attached can cause the system to hang, requiring a reboot to remedy.

Additionally, a single information handling system 102 connecting to multiple peripherals 125 (e.g., having different firmware versions) can also cause various problems.

Accordingly, embodiments of this disclosure may implement a globally unique identifier (GUID) based ACPI Peripheral Interconnect Table (APIT) to hold Runtime Object Entries to provide seamless synchronization of BKC firmware versions across multiple peripheral with devices an information handling system.

A Peripheral Interconnect Protocol (PIP) may be implemented over Firmware Management Protocol (FMP) to reinitialize the BKC firmware attributes from various ACPI and Firmware Interface Tables (FITs) across information handling systems and peripherals without the need for a reboot of the platform.

FIG. 2 illustrates an example architecture according to such an implementation. As shown, dock 225 includes a dock Peripheral Interconnect Table for managing the various devices that can be connected thereto. Information handling system 202 has a corresponding platform Peripheral Interconnect Table.

Information handling system 202 further implements an APIT, which includes Runtime Object Entries for each of the devices, providing an interface to the Fixed ACPI Description Table (FADT), Power Delivery (PD) system, BKC FIT, and the runtime memory map table.

The PIP described herein may provide for SoC-agnostic dynamic synchronization of various BKC attributes across peripheral devices with information handling system 202 without the need for a platform reboot. The PIP and APIT may operate together to provide a better user experience by maintaining the same behavior of peripherals connected to information handling system 202 across BKC firmware updates.

FIG. 3 illustrates another example architecture, in which dock 325 is coupled to information handling system 302.

The APIT of information handling system 302 may be synchronized with various ACPI tables and firmware tables to get the latest BKC settings for information handling system 302 and its peripherals, as well as update the corresponding service API in the table to perform synchronization without having a system reboot.

The APIT implements the interface for the BIOS firmware of information handling system 302 to synchronize and re-initialize, and it also holds the data structure entries of as peripherals such firmware dock PD objects for synchronization. The APIT may be managed with unique GUID attributes associated with the platform BIOS as well as peripheral devices to manage the BKC versions. The firmware of dock 225 may have different BKC versions when connected to information handling system 302, and the synchronization may provide a common behavior of each specified dock firmware.

The FMP dock BKC sync module may interface with peripheral docks to dynamically re-initialize the dock module level memory (e.g., for HDMI, NIC, USB-C, USB-A, etc.). The FMP port control structures may then be tuned to enable a control bit for any future resets.

Some systems according to this disclosure may implement a standardized update mechanism, referred to herein as Dell Firmware Update (DFU). When such an update occurs, a PIP notification of BKC changes may be generated, and the DFU BIOS BKC Sync module may perform dynamic re-initialization of the hardware-level objects. Any stale enumerated objects may be deleted in the device manager via an event notification, and the peripheral objects may be re-enumerated based on their connection status from PIP.

The APIT services may be called within the PIP context for a particular hardware object within a connected peripheral module, and the object-specific re-initialization may be handled during the firmware update itself without needing a separate reboot. Also, when a given information handling system 302 is connected to different docks having different dock firmware versions, the seamless synchronization happens over PIP without any platform reboot.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
an interface via which one or more peripherals are configured to be communicatively coupled to the at least one processor, wherein one of the one or more peripherals is a dock, and wherein a remainder of the one or more peripherals includes a plurality of monitors coupled to the information handling system via the dock;
wherein the at least one processor is configured to execute instructions for:
storing a data structure that includes data indicative of configuration settings for each of the one or more peripherals, wherein the data structure is an Advanced Configuration and Power Interface (ACPI) table, and wherein the configuration settings include settings for the plurality of monitors including a designation of a primary monitor, a spatial arrangement of the plurality of monitors, resolutions for the plurality of monitors, and color depths for the plurality of monitors;
communicating with the one or more peripherals according to the configuration settings of the data structure; and
in response to an occurrence of a critical event that causes a loss of communication with the one or more peripherals, restoring the configuration settings based on the data structure without a reboot of the information handling system.

2. The information handling system of claim 1, wherein the data structure is an ACPI Peripheral Interconnect Table (APIT).

3. The information handling system of claim 1, wherein the critical event is an update of a firmware of the one or more peripherals.

4. The information handling system of claim 1, wherein the critical event is a hot-plug event.

5. The information handling system of claim 1, wherein the critical event is the information handling system resuming from a low-power mode.

6. A method comprising:
an information handling system storing a data structure that includes data indicative of configuration settings for each of one or more peripherals that are configured to be coupled to the information handling system via an interface, wherein the data structure is an Advanced Configuration and Power Interface (ACPI) table, wherein one of the one or more peripherals is a dock, wherein a remainder of the one or more peripherals includes a plurality of monitors coupled to the information handling system via the dock, and wherein the configuration settings include settings for the plurality of monitors including a designation of a primary monitor, a spatial arrangement of the plurality of monitors, resolutions for the plurality of monitors, and color depths for the plurality of monitors;

the information handling system communicating with the one or more peripherals according to the configuration settings of the data structure; and in response to an occurrence of a critical event that causes a loss of communication with the one or more peripherals, the information handling system restoring the configuration settings based on the data structure without a reboot of the information handling system.

7. The method of claim 6, wherein the data structure is an ACPI Peripheral Interconnect Table (APIT).

8. The method of claim 6, wherein the critical event is an update of a firmware of the one or more peripherals.

9. The method of claim 6, wherein the critical event is a hot-plug event.

10. The method of claim 6, wherein the critical event is the information handling system resuming from a low-power mode.

11. An article of manufacture comprising a non-transitory, computer-readable medium having computer-executable code thereon that is executable by a processor of an information handling system for:

storing a data structure that includes data indicative of configuration settings for each of one or more peripherals that are configured to be coupled to the information handling system via an interface, wherein the data structure is an Advanced Configuration and Power Interface (ACPI) table, wherein one of the one or more peripherals is a dock, wherein a remainder of the one or more peripherals includes a plurality of monitors coupled to the information handling system via the dock, and wherein the configuration settings include settings for the plurality of monitors including a designation of a primary monitor, a spatial arrangement of the plurality of monitors, resolutions for the plurality of monitors, and color depths for the plurality of monitors;

communicating with the one or more peripherals according to the configuration settings of the data structure; and in response to an occurrence of a critical event that causes a loss of communication with the one or more peripherals, restoring the configuration settings based on the data structure without a reboot of the information handling system.

12. The article of claim 11, wherein the data structure is an ACPI Peripheral Interconnect Table (APIT).

13. The article of claim 11, wherein the critical event is an update of a firmware of the one or more peripherals.

14. The article of claim 11, wherein the critical event is a hot-plug event.

15. The article of claim 11, wherein the critical event is the information handling system resuming from a low-power mode.

* * * * *